United States Patent
Harada et al.

(10) Patent No.: US 9,764,467 B2
(45) Date of Patent: Sep. 19, 2017

(54) ROBOT, ROBOT SYSTEM, CONTROL DEVICE, AND CONTROL METHOD

(71) Applicant: Seiko Epson Corporation, Tokyo (JP)

(72) Inventors: Tomoki Harada, Matsumoto (JP); Koichi Hashimoto, Sendai (JP); Shogo Arai, Sendai (JP)

(73) Assignee: Seiko Epson Corporation (JP)

( * ) Notice: Subject to any disclaimer, the term of this patent is extended or adjusted under 35 U.S.C. 154(b) by 58 days.

(21) Appl. No.: 14/612,701

(22) Filed: Feb. 3, 2015

(65) Prior Publication Data
US 2015/0217451 A1 Aug. 6, 2015

(30) Foreign Application Priority Data

Feb. 4, 2014 (JP) ................................. 2014-019827

(51) Int. Cl.
*B25J 9/16* (2006.01)

(52) U.S. Cl.
CPC ........... *B25J 9/1612* (2013.01); *B25J 9/1697* (2013.01); *G05B 2219/39543* (2013.01); *G05B 2219/40053* (2013.01); *Y10S 901/47* (2013.01)

(58) Field of Classification Search
CPC ...... B25J 9/1612; B25J 9/1697; B25J 19/021; B25J 19/023; B25J 9/1669; B25J 13/08; Y10S 901/47; G05B 2219/39; G05B 2219/39388; G05B 2219/39393; G05B 2219/39543; G06K 2209/19; G06K 2209/40; G06T 7/0051; G06T 7/0053; G06T 7/0075–7/0077

USPC .......... 700/253, 250, 252, 258, 259; 901/47; 318/586.16

See application file for complete search history.

(56) References Cited

U.S. PATENT DOCUMENTS

| | | | | |
|---|---|---|---|---|
| 5,692,061 A | * | 11/1997 | Sasada | G06K 9/00201 382/106 |
| 6,995,762 B1 | * | 2/2006 | Pavlidis | G06T 17/00 345/419 |
| 2013/0211593 A1 | * | 8/2013 | Domae | B25J 9/1612 700/258 |
| 2013/0238124 A1 | * | 9/2013 | Suzuki | B25J 9/16 700/250 |
| 2013/0238125 A1 | * | 9/2013 | Suzuki | B25J 9/1612 700/253 |
| 2013/0238128 A1 | * | 9/2013 | Suzuki | B25J 9/1669 700/258 |
| 2014/0067317 A1 | * | 3/2014 | Kobayashi | B25J 9/1697 702/153 |
| 2014/0200714 A1 | * | 7/2014 | Kawamoto | B25J 13/08 700/257 |
| 2015/0158176 A1 | * | 6/2015 | Fujita | B25J 9/1697 700/97 |

FOREIGN PATENT DOCUMENTS

JP 2009-128201 A 6/2009

\* cited by examiner

*Primary Examiner* — Bao Long T Nguyen
(74) *Attorney, Agent, or Firm* — Harness, Dickey & Pierce, P.L.C.

(57) ABSTRACT

A robot includes: a hand; and a control unit that operates the hand, in which the control unit generates three-dimensional point group information for a partial image forming a captured image obtained by an imaging unit, and causes the hand to hold an object included in the partial image.

7 Claims, 12 Drawing Sheets

ROBOT, ROBOT SYSTEM, CONTROL DEVICE, AND CONTROL METHOD

BACKGROUND

1. Technical Field

The present invention relates to a robot, a robot system, a control device, and a control method.

2. Related Art

Robots perform work including an operation in which target objects stacked in a disorderly manner are taken out one by one and assembled to other objects. Such an operation is, for example, a pin picking operation and is regarded as being important in industry. When the target objects are taken out, the target objects stacked in a disorderly manner are sometimes gripped by a jig or an exclusive device mounted to a robot arm and aligned again so as to assume a fixed position and posture. However, since it is necessary to mount different exclusive jigs or devices to the robot arm according to shapes and sizes of the target objects, economical and temporal costs are increased.

In order to resolve or reduce such a problem, there has been an attempt to irradiate a target object with light beams using a light source such as a projector or a laser beam generator and acquire three-dimensional information of the target object by processing light reflected from the target object. The acquired three-dimensional information is used for processing of requiring a position and posture of the target object, but is not used as general purpose. In addition, the processing is time consuming.

Accordingly, there is an attempt to acquire three-dimensional information including depth information of a target object using a more general-purpose device and acquire a position and posture of the target object using the acquired three-dimensional information, as in a camera. For example, the three-dimensional information is image data formed from a three-dimensional point group indicative of a shape of the target object. When a position and posture of a predetermined target object are required, matching of a template of the predetermined target object with a three-dimensional point group is performed. However, the number of dimensions to be calculated is increased in the matching of the three-dimensional point group, compared to that of a two-dimensional image. That is, the number of dimensions when the position and posture of the target object are required is increased from three dimensions to six dimensions according to the number of dimensions of the matching target object increasing from two dimensions to three dimensions. When a similar computation technique is used, a computation amount and a computation time are exponentially increased according to the number of dimensions of the target object. For this reason, there is still a need for a large amount of computation amount and computation time to estimate the position and the posture regarding the three-dimensional point group.

In order to resolve such problems, a method of using shape characteristics of a target object to estimate a position and posture thereof is proposed. For example, JP-A-2009-128201 discloses a pin picking system including a position and posture recognition device capable of performing pin picking with respect to a part group in which parts having the same shapes are stacked in a disorderly manner, and the like. In the pin picking system, linear light regions in which light regions on a captured image extend independently on a straight line are extracted from the captured image. In more detail, the light regions are extracted from the captured image using a threshold, and the linear light regions extending independently and linearly are extracted from the respective extracted light regions without intersection of the light regions.

However, objects used at a work site such as a factory has different shapes. For example, a large number of objects such as screws and bolts, each having a small plane region on a surface thereof, exist. Since such objects are packed into a bag made of plastic film to be transported and delivered, the objects are rarely aligned in a work space. Accordingly, when either of the objects is operated as a target object by a robot, a position and posture thereof is required to be individually specified.

In this context, it is considered to separate a point group belonging to a region regarded as one object from three-dimensional point group information of an object group stacked in bulk, and acquire position and posture information indicative of a position and posture of the object from a shape of the object indicated by the separated point group. When the whole three-dimensional point group information of the object group stacked in bulk is used in a case of determining the region regarded as one object, a throughput and a processing time for determining the region are increased. In addition, when the region regarded as one object is erroneously determined, the position and posture of the object are specified from the point group belonging to the erroneously determined region so that a position and posture of an object which is not originally present are specified.

SUMMARY

An advantage of some aspects of the invention is to provide a robot, a robot system, a control device, and a control method, capable of reducing a processing time and improving detection accuracy, in estimating a position and posture of a target object.

An aspect of the invention is directed to a robot including a hand; and a control unit that operates the hand, in which the control unit generates three-dimensional point group information for a partial image forming a captured image obtained by an imaging unit, and causes the hand to hold an object included in the partial image.

When the three-dimensional point group process is performed for the entire captured image, the number of calculation processes increases. However, the three-dimensional point group process is performed for a partial image by the above-described configuration, the number of calculation processes can be reduced and thus the working can be performed with high speed.

Another aspect of the invention is directed to the robot described above, wherein the control unit defines a first region indicating the object, and a second region including the first region and having a predetermined shape, from the captured image; generates first three-dimensional point group information corresponding to the first region and second three-dimensional point group information corresponding to the second region on the basis of the captured image; selects a set in which a length of a line segment between two points is within a predetermined length range from among a plurality of sets each of which is formed by two points included in the first three-dimensional point group information; extracts points which are within a predefined range from the line segment between the two points forming the selected set, from the second three-dimensional point group information; and selects a central axis in which a difference between a distance to each extracted point and a predetermined threshold value is within a predefined range, from the second three-dimensional point group information.

According to this configuration, the first three-dimensional point group information corresponding to the first region and the second three-dimensional point group information corresponding to the second region are defined as the process target on the basis of the captured image, the process amount can be reduced. In addition, a point indicating a target image formed from a point that a radius from the central axis connecting two points whose length is in a predetermined range is in a predetermined range is specified. Therefore, as the target having curved surface, the position and posture of the target in which the shape has a curved shape is estimated. Further, since the central axis is selected based on the point of the second three-dimensional point group information relating to the second region wider than the first region relating to the first three-dimensional point group information in which a set of two dots used in the estimation of the central axis is selected, it is possible to reduce the process amount necessary for the estimation of the position and posture of the target and to perform process with high speed without deteriorating an accuracy.

Still another aspect of the invention is directed to the robot described above, wherein the control unit detects a region in which luminance is greater than a predefined threshold value from the captured image, and determines a region in which an index value indicating a shape of the detected region is within a predetermined range as the first region.

According to this configuration, since the region in which the object is definitely represented is selected as the first region, it is possible to accurately grasp the object represented in the selected first region.

Yet another aspect of the invention is directed to the robot described above, wherein a shape of the second region is a rectangular shape, and the control unit defines a third region whose length is larger than a length of the second region in a longitudinal direction from the captured image, extracts third three-dimensional point group information corresponding to the third region from the captured image, and calculates a length of the object in a direction of the central axis on the basis of a distribution of points included in the third three-dimensional point group information in the direction of the central axis.

According to this configuration, the distribution of the point of the third three-dimensional point group information in a direction of the central axis can be obtained with a wider manner than the second three-dimensional point group information. Therefore, it is possible to obtain a length in the direction of the central axis without missing a point indicating the object and to respectively identify the objects with different lengths even when the longer object is specified since the objects with different lengths are mixed.

Still yet another aspect of the invention is directed to a control device including an image reception unit that receives a captured image obtained by an imaging unit capturing an image of a plurality of objects; and a processing unit that operates a robot, in which the processing unit generates three-dimensional point group information for a partial image forming the captured image, and causes the robot to hold an object included in the partial image.

When the three-dimensional point group process is performed for the entire captured image, the number of calculation processes increases. However, the three-dimensional point group process is performed for a partial image by the above-described configuration, the number of calculation processes can be reduced and thus the working can be performed with high speed.

Further another aspect of the invention is directed to a robot system including an imaging unit that captures an image of a plurality of objects; a robot; and a control unit that operates the robot, in which the control unit generates three-dimensional point group information for a partial image forming a captured image obtained by the imaging unit, and causes the robot to hold an object included in the partial image.

When the three-dimensional point group process is performed for the entire captured image, the number of calculation processes increases. However, the three-dimensional point group process is performed for a partial image by the above-described configuration, the number of calculation processes can be reduced and thus the working can be performed with high speed.

Still further another aspect of the invention is directed to a control method including capturing an image of a plurality of objects; generating three-dimensional point group information for a partial image forming a captured image obtained by capturing an image of the plurality of objects; and causing a robot to hold an object included in the partial image by using the generated three-dimensional point group information.

When the three-dimensional point group process is performed for the entire captured image, the number of calculation processes increases. However, the three-dimensional point group process is performed for a partial image by the above-described configuration, the number of calculation processes can be reduced and thus the working can be performed with high speed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described in detail with reference to the drawings.

Figure 1:
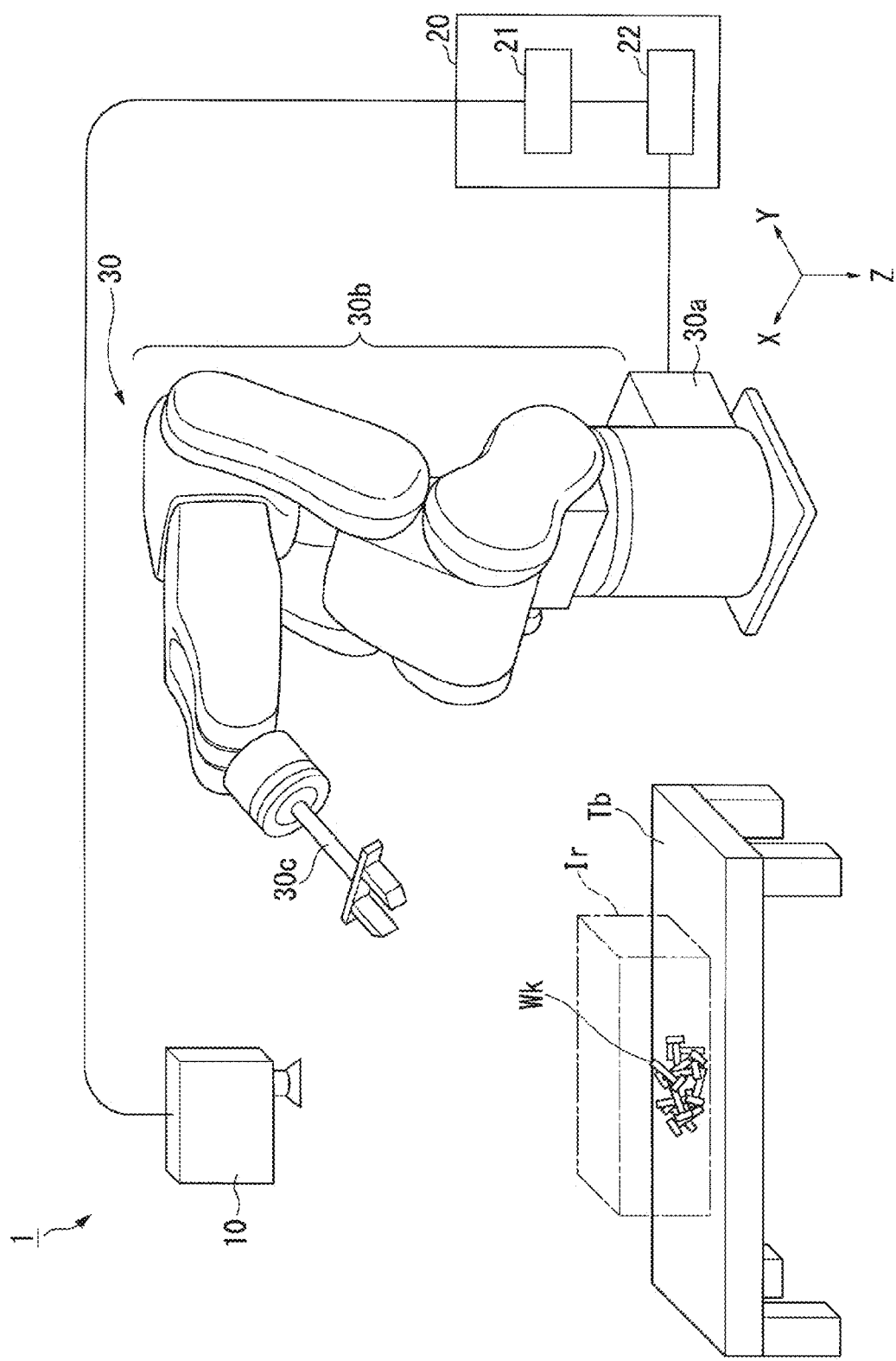
FIG. 1 is a perspective view schematically illustrating a robot system according to an embodiment of the invention.

FIG. 1 is a perspective view schematically illustrating a robot system 1 according to an embodiment of the invention.

As shown in FIG. 1, the robot system 1 includes an imaging device 10, a control device 20, and a robot 30. In addition, the scale of parts, structures, and the like in FIG. 1 differs from the actual scale in order to clearly illustrate features.

The imaging device 10 captures a three-dimensional shape of a subject and generates three-dimensional image data indicative of the captured three-dimensional shape. For example, the generated three-dimensional image data is data formed as position information for each of a plurality of sample points for sampling the three-dimensional shape with a predetermined resolution. Each sample point indicates orthogonal coordinates (X, Y, and Z) in a three-dimensional Euclidean space for sampling a surface of the subject. That is, the generated image data is point group data including a plurality of sample point data. Each sample point data is data indicative of a position for each sample point for sampling the surface of the subject. In addition, each individual sample point data may also include a luminance value indicative of brightness at the point. The sample point is equivalent to a pixel in two-dimensional image data, and the surface of the subject is expressed as a surface spread by the plurality of sample points. An image indicated by the image data is referred to as "a point group image".

In the example shown in FIG. 1, the X direction refers to a left direction, the Y direction refers to a depth direction, and the Z direction refers to a downward direction.

For example, the imaging device 10 is a three-dimensional sensor for shape inspection. The imaging device 10 is installed at a position capable of optically observing a region in which, for example, an object (hereinafter, referred to as "a target object") Wk to be operated by the robot 30, as the subject is stacked. The target object Wk is a cylindrical object having a curved surface on a surface thereof, as will be described later. A surface of a workbench Tb is parallel with a horizontal plane and a plurality of target objects Wk are stacked on the surface of workbench Tb in a disorderly manner.

The imaging device 10 is installed such that, for example, an optical axis thereof is directed in a vertical (downward) direction to the horizontal plane. The imaging device 10 captures a 1-frame three-dimensional image indicative of the plurality of target objects Wk included in an imaging region Ir. The imaging region Ir is a three-dimensional region having a predetermined size in which the imaging device 10 is capable of capturing an image of the subject placed in the region. Accordingly, the three-dimensional image (three-dimension image) obtained by imaging is an image indicative of three-dimensional shapes of the plurality of target objects Wk, and is expressed as sample point data formed by a plurality of sample points. The sample points are distributed at higher density as luminance thereof is higher.

The imaging device 10 outputs the sample point data indicative of the three-dimensional image obtained by imaging to the control device 20 as three-dimensional image data.

Furthermore, the imaging device 10 captures a 1-frame two-dimensional image (two-dimension image) indicative of the plurality of target objects Wk included in the imaging region Ir. The two-dimensional image is equivalent to an image formed by projecting the above three-dimensional image onto the plane intersecting the optical axis of the imaging device 10. That is, the two-dimensional image indicates the same subject in the same imaging region Ir as the three-dimensional image, and each imaging region is mapped. The imaging device 10 outputs two-dimensional image data indicative of the captured two-dimensional image to the control device 20. In the following description, the two-dimensional image data and the three-dimensional image data are simply and collectively referred to as "image data".

The control device 20 controls movement of the robot 30, based on the image data input from the imaging device 10. The control device 20 includes an image data acquisition unit (an image receiving unit) 21 and a control unit (a processing unit) 22.

The image data is input from the imaging device 10 to the image data acquisition unit 21, and the image data acquisition unit 21 outputs the input image data to the control unit 22. For example, the image data acquisition unit 21 is a data input interface.

The control unit 22 generates point group data (point group information) indicative of a partial image which is a portion of the captured three-dimensional image among the input three-dimensional image data, and allows the robot 30 to grip one target object Wk indicated on the partial image indicated by the generated point group data. Here, the control unit 22 determines a region indicative of a partial shape of one target object Wk indicated by the input two-dimensional image data, as an attention region. The control unit 22 calculates a position and arranged direction (posture) of one target object Wk, based on the point group data indicative of the three-dimensional image in the determined attention region. When the position and direction of the target object Wk are calculated, the control unit 22 regards the target object Wk as having a cylindrical shape and calculates a direction and length of a cylindrical central axis by application of a RANSAC (Random Sample Consensus) method. Here, the control unit 22 determines the calculated middle coordinates and direction of the central axis as the position and posture of the target object Wk, respectively. In the following description, the position, the posture, or the position and the posture are collectively referred to as "space state" in some cases. In addition, the control unit 22 may also determine a length of the target object Wk.

The control unit 22 controls movement of the robot 30, based on the calculated space state of the target object Wk. Furthermore, when the length of the target object Wk is determined, the control unit 22 may also control movement of the robot 30, based on the length.

The control unit 22 allows, for example, a hand section 30c (described later) of the robot 30 to approach the calculated position, and pinch and grip the target object Wk in a direction intersecting the calculated posture. A load signal indicative of force detected by the hand section 30c is input from the robot 30 to the control unit 22, and a control signal for controlling movement of the hand section 30c based on the input load signal is output to the robot 30. A configuration of the control unit 22 will be described later.

The robot 30 is, for example, a six-axis vertical articulated robot, and includes a support 30a, an arm section 30b, and a hand section 30c. The robot 30 has a degree of freedom of six axes by connection movement of the support 30a, the arm section 30b, and the hand section 30c, and is capable of freely changing the position and posture of the target object Wk gripped by the hand section 30c. In addition, the robot 30 operates one of the arm section 30b and the hand section 30c or a combination thereof by control of the control unit 22. The hand section 30c has two tip portions, and the two tip portions are arranged such that respective longitudinal directions thereof face each other.

The degree of freedom of the robot 30 is not limited to six axes, and may also be seven axes or more or five axes or less. In addition, the support 30a may also be installed on a fixed place with respect to a floor surface such as a wall or a roof.

The robot 30 has a force sensor (not shown) for detecting force and moment applied to the hand section 30c at a predetermined time interval (for instance, 1 ms), and outputs load signals indicative of the detected force and moment to the control device 20. The robot 30 has an encoder (not shown). The encoder detects an angle of each joint of the robot 30 and outputs the detected angle of each joint to the control device 20.

Next, the configuration of the control unit 22 according to the embodiment will be described.

Figure 2:
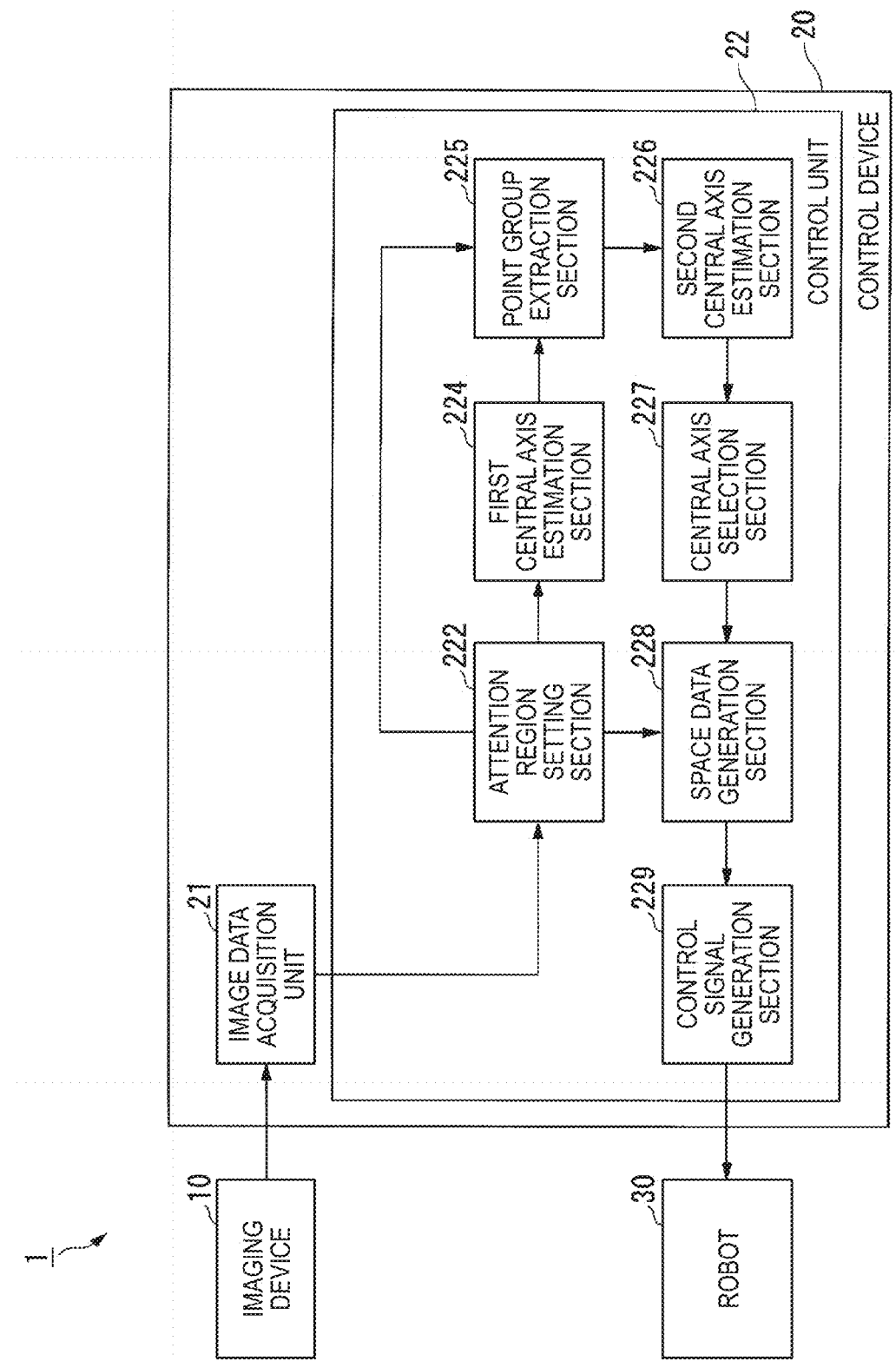
FIG. 2 is a block diagram schematically illustrating a configuration of a control unit according to the embodiment.

FIG. 2 is a block diagram schematically illustrating the configuration of the control unit 22 according to the embodiment.

The control unit 22 includes an attention region setting section 222, a first central axis estimation section 224, a point group extraction section 225, a second central axis estimation section 226, a central axis selection section 227, a space data generation section 228, and a control signal generation section 229.

The image data is input from the image data acquisition unit 21 to the attention region setting section 222. The attention region setting section 222 determines Ni attention regions (Ni being an integer which is equal to or more than 2, for instance 3) indicative of the target objects from the two-dimensional images indicated by the input two-dimensional image data. The attention region is a two-dimensional region to be processed at a time at the first central axis estimation section 224, the point group extraction section 225, the second central axis estimation section 226, the central axis selection section 227, and the space data generation section 228. That is, the three-dimensional region corresponding to the attention region is equivalent to a partial image which is a portion of the imaging region. Hereinafter, a case in which Ni is 3 will be mainly described for example.

The three attention regions include regions indicative of the same respective target objects, and are respectively referred to as "regions 1, 2, and 3". The region 2 is a region including the region 1 (for instance, a region circumscribed to the region 1), and is a region having a predetermined shape (for instance, a rectangular shape). The region 3 is a region including the region 2 (for instance, a region having a longer longitudinal length than the region 2 by a predetermined length), and is a region having a predetermined shape (for instance, a rectangular shape). The attention region setting section 222 generates point group data (three-dimensional point group information) 1, 2, and 3 by extracting sample points indicative of coordinates included in the three-dimensional regions respectively corresponding to the regions 1, 2, and 3 as the two-dimensional regions, from the image data. The attention region setting section 222 outputs the generated point group data 1 to the first central axis estimation section 224, outputs the point group data 2 to the point group extraction section 225, and outputs the point group data 3 to the space data generation section. In addition, the three-dimensional regions which are portions of the attention regions corresponding to the regions 1, 2, and 3 as the two-dimensional regions are respectively referred to as "partial regions 1, 2, and 3". Accordingly, the partial regions 1, 2, and 3 are regions which are respectively projected onto the regions 1, 2, and 3. In other words, the point group data (three-dimensional point group information) indicates aggregations of the sample points distributed in the partial regions 1, 2, and 3, and the aggregation of each sample point is data which mainly indicates at least a portion of the shape of one target object or is a possibility of indicating the same.

As described above, since the attention region setting section 222 selects the regions 1, 2, and 3 from the corresponding two-dimensional image data without performing analysis of the three-dimensional image data when generating the point group data 1, 2, and 3, the attention region setting section 222 can remarkably reduce a throughput.

A process in which the attention region setting section 222 determines the attention region will be described later.

The first central axis estimation section 224 selects a set which satisfies a predetermined condition among sets (point pairs) consisting of two points of the sample points indicated by the point group data 1 input from the attention region setting section 222. The first central axis estimation section 224 determines a line segment between the two points forming the selected set as a candidate of the central axis (a central axis candidate).

Here, the first central axis estimation section 224 extracts two points from the sample points indicated by the point group data 1, and selects Ne point pairs (Ne being a predetermined number) in which a distance L between the extracted two points is within a predetermined range from a length l, for example, between from 0.81 to 1.01. Thereby, a point pair consisting of one point on the surface of the target object and one point on the bottom surface thereof is extracted, and other point pairs are excluded.

For example, Ne is a minimum value of the number of point pairs in which a probability that any two points selected from the total number of sample points M which may be taken by the target object are not included in a partial region 1 is lower than a significance level p (for instance, 0.05). Ne is expressed by Expression (1).

$$(1 - {}_MC_2/{}_NC_2)^{Ne} < p \qquad (1)$$

In Expression (1), N is the maximum number of sample points which may be present in the partial region 1. That is, N depends on spatial resolution of the sample points included in the image data acquired by the imaging device 10. As such, the target object can be reliably detected by determining Ne, and the throughput can be reduced.

The first central axis estimation section 224 calculates a coefficient of a linear function (an axial expression) indicative of a straight line between two points forming each of the selected point pairs. The calculated coefficient indicates a gradient and X-, Y-, and Z-intercepts of the straight line.

The first central axis estimation section 224 selects a point pair in which a gradient θz to an X-Y plane derived from the calculated coefficient is within a range of a predetermined gradient, and excludes point pairs outside the range. For example, the range of the predetermined gradient is a range of a gradient having a smaller value than a threshold θmax of the gradient. For example, θmax is a maximum value of the gradient θz at which the target object may be gripped under the shape and the arrangement of a member such as a jig constituting the hand section 30c. Thereby, images of target objects which may not be gripped by the hand section 30c are excluded from the processing target. In addition, since the direction of the straight line approximates to the direction of the optical axis of the imaging device 10 as θz is increased, the number of sample points indicative of the curved surface around the straight line is decreased. This is because a region when the curved surface is projected onto the X-Y plane is decreased. Since the curved surface is excluded from the processing target, useless processing can be prevented.

The first central axis estimation section 224 outputs selection point pair information indicative of the selected point pair to the point group extraction section 225.

The selection point pair information is input from the first central axis estimation section 224 to the point group extraction section 225, and the point group data 2 is input from the attention region setting section 222 to the point group extraction section 225.

The point group extraction section 225 extracts sample points, which are within a predetermined distance from a line segment joining two points forming each of the point pairs indicated by the selection point pair information, from the sample points indicated by the point group data 2, as points belonging to the line segment, and excludes other sample points. For example, the determined distance ρ has a larger value than a radius r of the target object, and has a smaller value, for example 2r, than an average distance between adjacent target objects. Thereby, sample points indicative of the surface of one target object are reliably acquired from the wider partial region 2 than the partial region 1, and sample points indicative of the surfaces of the other target objects are excluded to the utmost. The point group extraction section 225 counts the number of extracted sample points Nc (vote).

The point group extraction section 225 selects a point pair in which the number of extracted sample points Nc is within a range of a predetermined number, and excludes point pairs outside the range of the predetermined number. For example, the range of the predetermined number is a range indicated by Expression (2).

$$RN_{max} \cos \theta_{max} < N_c < N_{max} \quad (2)$$

In Expression (2), R refers to a set value according to reliability of the imaging device 10. The reliability is increased as R increases and the reliability is decreased as R decreases. For example, R is a real number from 0.7 to 0.95. In addition, the maximum value and the minimum value of R are "1" and "0", respectively. Nmax is a maximum value of a sample point which may be taken by the target object in the partial region 2. In a case in which the target object has a cylindrical shape, when the target object is arranged such that the central axis thereof is vertical to the direction of the optical axis of the imaging device 10, the whole target object is included in the imaging region Ir, and the distance from the imaging device 10 is shortest, the number of sample points forming the captured image data is maximized. θmax is a threshold of the above-mentioned gradient. Thereby, a line segment including the sample points indicative of the target object, a side surface of which is sufficiently exposed to the imaging device 10, within a predetermined distance ρ is selected. Through such a selected line segment, a point pair consisting of two points joined by the line segment is specified.

The point group extraction section 225 outputs extraction point group information indicative of the extracted sample points to the second central axis estimation section 226, for each selected point pair.

The second central axis estimation section 226 estimates a central axis candidate on the surface (curved surface) spread by the sample points indicated by the extracted point group information input from the point group extraction section 225, for each point pair. When the second central axis estimation section 226 estimates the central axis candidate, the second central axis estimation section 226 may use, for example, an SQP (Sequential Quadratic Programming) method. The second central axis estimation section 226 generates central axis information consisting of a coefficient of the estimated central axis candidate, and maps the generated central axis information and the extraction point group information for each point pair to output the same to the central axis selection section 227.

The central axis information and the extraction point group information are input from the second central axis estimation section 226 to the central axis selection section 227. The central axis selection section 227 selects a central axis in which a gradient θz to the X-Y plane derived from the coefficient of the central axis candidate is within a range of a predetermined gradient, and excludes central axes outside the range. The range of the predetermined gradient is a range of a gradient at which the first central axis estimation section 224 selects the point pair, namely, a range of a gradient having a smaller value than a threshold θmax of the gradient.

The central axis selection section 227 calculates an estimation error err, for example, using Expression (3) based on the sample points indicated by the extraction point group information corresponding to each of selected central axes, and selects a central axis in which the calculated estimation error err is less than a predetermined error. When the selected central axis is present in plural numbers, the central axis selection section 227 selects a central axis in which the estimation error err is smallest.

$$err = \sum_{i=1}^{n} |d_i - r|/n \quad (3)$$

In Expression (3), n refers to the number of sample points belonging to a central axis, namely, the number of sample points included within the predetermined distance ρ from the central axis. Here, i is an index to distinguish each sample point. Here, |•••| is an absolute value of •••. Here, $d_i$ refers to a distance between a sample point i and a central axis. That is, the estimation error err refers to an average of absolute values in the error between the distance $d_i$ from the central axis on each sample point and a radius r.

The central axis selection section 227 outputs central axis information according to the selected central axis to the space data generation section 228.

The central axis information is input from the central axis selection section 227 to the space data generation section 228, and the point group data 3 is input from the attention region setting section 222 to the space data generation section 228. The space data generation section 228 calculates a position and posture of the target object, based on the sample points indicated by the point group data 3 and the central axis information.

Here, the space data generation section 228 specifies a direction of the central axis as the posture of the target object, based on the constant of the central axis indicated by the central axis information. In addition, the space data generation section 228 calculates a representative point of coordinates of the sample points indicated by the point group data 3, for example, a center of gravity point as the position of the target object. However, since the distribution of the sample points sometimes converges in one surface, the center of gravity point does not necessarily represent the position of the target object. Accordingly, the space data generation section 228 may also calculate an intersection point between a surface perpendicular to a central axis passing through the calculated center of gravity point and the central axis, as the position of the target object.

In addition, the space data generation section 228 may also calculate a length of the target object. Here, the space data generation section 228, for example, specifies a direction of the central axis from the constant of the central axis indicated by the central axis information, and requires distribution with respect to coordinates (central axis coordinates) of the specified direction of the central axis of the sample points indicated by the point group data 3. The distribution is indicated as a histogram consisting of the number of sample points for each section in which the central axis coordinates are sorted by a predetermined width.

The space data generation section 228 specifies a region in which a section having the number of sample points larger than a predetermined first threshold spatially continues, as a region of the target object, and calculates a length of the region of the target object as the length of the target object. The first threshold is a minute value which is significantly larger than "0". Since the length is specified using the distribution with respect to the central axis coordinates of the sample points indicated by the point group data 3, a target object having a predetermined length can be specified even though target objects having different lengths are mixed in the imaging region Ir. In addition, the space data generation section 228 may also calculate a center of gravity point of the region of the target object or an intersection point between a surface perpendicular to a central axis passing through the center of gravity point and the central axis, as the position of the target object.

In addition, when the target object includes a shape portion incapable of approximating to a cylindrical shape and a portion (a non-cylindrical region e.g. a head portion of a bolt) in which the target object as a whole is incapable of approximating to a cylindrical shape when the shape portion is present, the space data generation section 228 may also calculate a position of the non-cylindrical region. Specifically, the space data generation section 228 specifies a region consisting of a section in which the number of sample points is larger than a predetermined second number threshold, as a non-cylindrical region, and calculates a center of gravity point of the specified non-cylindrical region as a position of the region. For example, the second number threshold is a larger value than the number of sample points which are distributable on the circumference of a radius r. Thereby, the region having a larger surface than the radius r is specified as a non-cylindrical region. In addition, the space data generation section 228 may also compare central axis coordinates of the non-cylindrical region and central axis coordinates of the target object to distinguish positive and negative directions of the target object.

In addition, when the calculated position and posture of the target object are indicated as a coordinate value and an azimuth angle based on a camera coordinate system on the basis of the imaging device 10, the space data generation section 228 may also convert the calculated coordinate value and azimuth angle into a coordinate value and an azimuth angle based on a robot coordinate system on the basis of the robot 30. To this end, the space data generation section 228 previously sets a conversion expression for converting from the camera coordinate system to the robot coordinate system.

The space data generation section 228 generates space data indicative of the calculated position, posture, and length of the target object. The space data generation section 228 outputs the generated space data to the control signal generation section 229.

The control signal generation section 229 generates a control signal for controlling movement of the robot 30, based on the load signal input from the robot 30 and the space data input from the space data generation section 228. The control signal generation section 229 outputs the generated control signal to the robot 30. Thereby, the movement of the robot 30 is controlled.

For example, the control signal generation section 229 moves the hand section 30c of the robot 30 to a work start position, and generates and outputs a control signal for rotating a direction, in which two tip portions included in the hand section 30c face each other, in a work start direction. For example, the work start position is a position away from the position indicated by the input space data at a predetermined interval. For example, the work start direction is the same direction as the posture indicated by the space data. In addition, the control signal generation section 229 calculates a position and direction of the hand section 30c, based on the angle of each joint indicated by the load signal input from the robot 30. For example, the control signal generation section 229 may also generate and output a control signal for controlling movement of each component of the robot 30 such that a distance between the calculated position and a target position and a differential between the calculated direction and a target direction are each decreased as time elapses. Before a predetermined work start, a predetermined work start position and work start direction may also be used as a target position and a target direction, respectively. During a predetermined work, for example, the position and posture indicated by the space data may also be used as a target position and a target direction, respectively.

In addition, the control signal generation section 229 may also generate and output control signals for controlling positions and directions of two tip portions, based on force indicated by the input load information. For example, when the two tip portions are spaced apart from each other, the control signal generation section 229 allows the robot 30 to grip the target object by narrowing the distance between the two tip portions toward each other. Here, the control signal generation section 229 controls force through which the tip portions pinch the target object such that the force detected by the tip portions becomes a predetermined target value. When the target object is gripped, the control signal generation section 229 can release the pinching force of the target object with respect to the tip portions, and release the target object by controlling a distance between the two tip portions such that the distance is widened.

Example of Two-Dimensional Image

Next, an example of a two-dimensional image obtained by the imaging device 10 will be described.

Figure 3:
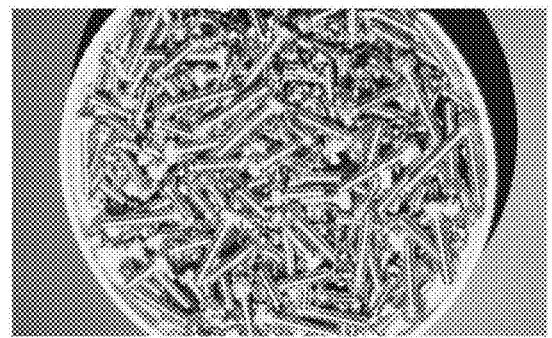
FIG. 3 is a view illustrating an example of a two-dimensional image.

FIG. 3 is a view illustrating an example of the two-dimensional image.

The two-dimensional image shown in FIG. 3 is an image of a subject within a predetermined imaging region Ir. The two-dimensional image indicates surfaces of a plurality of target objects stacked in a disorderly manner, and is formed by a plurality of pixels. Two-dimensional image data indicative of the two-dimensional image indicates a luminance value for each pixel. In FIG. 3, the luminance value is lower as the pixels become thicker, and the luminance value is higher as the pixels become thinner.

Model of Shape of Target Object

Next, an approximate model to a shape of a target object will be described.

Figure 4:
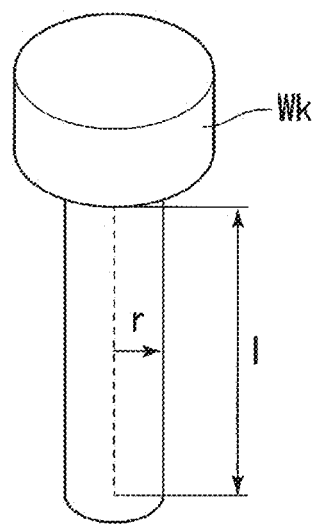
FIG. 4 is a view illustrating an example of an approximate model to a shape of a target object.

FIG. 4 is a view illustrating an example of the approximate model to the shape of the target object.

The target object Wk is a cylindrical object at least a portion of which approximates to a cylindrical shape. Thereby, a length l, a radius r, or both of the target object Wk are used as the characteristic length thereof. Since the target object Wk shown in FIG. 4 has an elongated shape in which the length l is considerably larger compared to the radius r, the length l is mainly used as the characteristic length. The length l and the radius r may also be previously set as known parameters in the above-mentioned control unit 22.

In addition, the target object Wk has a head portion larger than the radius r. The head portion is equivalent to a non-cylindrical region which may not approximate to the cylindrical shapes of the length l and the radius r.

Process of Determining Attention Region

Next, a process in the attention region setting section 222 which determines the attention region will be described.

Figure 5:
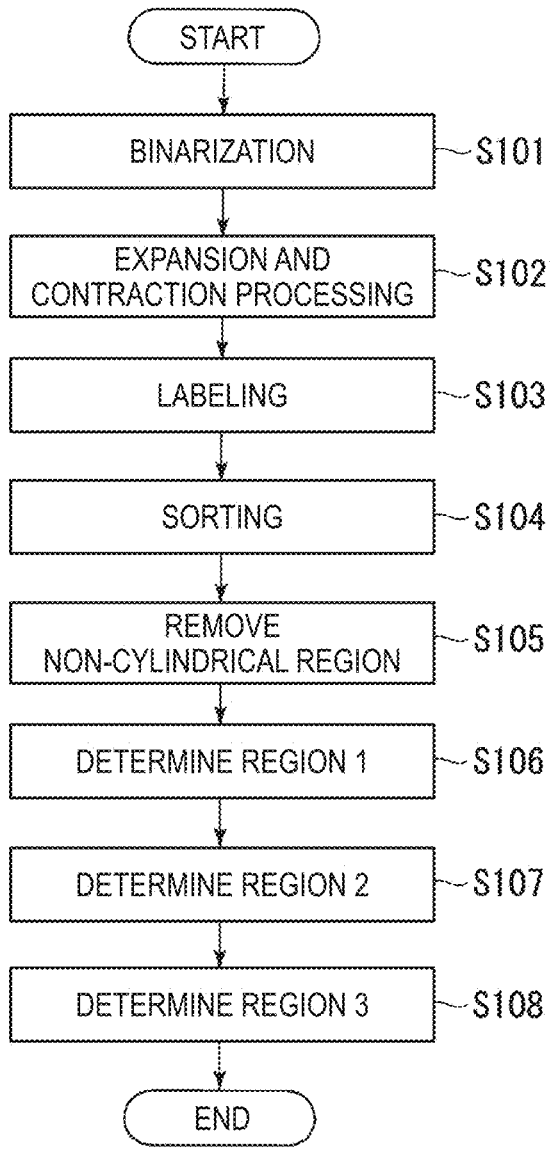
FIG. 5 is a flowchart illustrating a process in which an attention region setting section determines an attention region.

FIG. 5 is a flowchart illustrating a process in which the attention region setting section 222 determines the attention region.

(Step S101) The attention region setting section 222 generates binary data by performing binary processing on the two-dimensional image data input from the image data acquisition unit 21. Here, the attention region setting section 222 determines a signal value for each pixel as "1" or "0", and generates binary data indicative of the signal value for each pixel. As described above, the attention region setting section 222 determines the signal value as "1" with respect to the pixel having a luminance value which excesses a predetermined luminance value threshold, and determines the signal value as "0" with respect to the pixel having a luminance value which is equal or less than the predetermined luminance value threshold.

In the following description, the region in which the pixel having a signal value of "1" is spatially and continuously formed is referred to as "a light region", and the region in which the pixel having a signal value of "0" is spatially and continuously formed is referred to as "a dark region". That is, the light region is a region in which the entirety or a portion of the shape of the target object is expressed. When a plurality of target objects are included in the imaging region Ir, a plurality of light regions are expressed in one binary data. Subsequently, the process proceeds to step S102.

(Step S102) The attention region setting section 222 performs expansion processing and contraction processing on the generated binary data. The expansion processing and the contraction processing are collectively referred to as "expansion/contraction processing". The expansion processing is processing for expanding the light region by one pixel by determining the signal value of the pixel, which is present on the boundary with the light region in the dark region, as "1". The contraction processing is processing for contracting the light region by one pixel by determining the signal value of the pixel, which is present on the boundary with the dark region in light region, as "0". Thereby, unevenness on the boundary between the light region and the dark region appeared in the binary data is smoothed due to a difference of density of the sample point based on a difference of luminance of the target object. The attention region setting section 222 may also perform the contraction processing before or after the expansion processing. In addition, the attention region setting section 222 may also repeat the expansion/contraction processing a predetermined number of times (for instance, three times). Thereby, the degree of smoothing on the boundary between the light region and the dark region is capable of increasing. Subsequently, the process proceeds to step S103.

(Step S103) The attention region setting section 222 specifies each light region indicated by the binary data on which the expansion/contraction processing is performed (labeling). Subsequently, the process proceeds to step S104.

(Step S104) The attention region setting section 222 calculates a size index value (for instance, a region, or a length) of the specified each light region and an index value (for instance, an elliptical eccentricity) indicative of the shape thereof. The attention region setting section 222 determines whether or not to select the light region as the candidate of the region 1, based on the calculated size index value and shape index value (sorting).

For example, the length is the longest distance of distances between two pixels which are arbitrarily selected from the pixels forming the attention light region. The elliptical eccentricity is a ratio of a distance between focuses of an ellipse, which is inscribed or circumscribed to the attention light region, to the major axis thereof. The elliptical eccentricity is often referred to as "an eccentricity".

For example, when the calculated size index value is within a predetermined range on the basis of the size index value of the target object, the attention region setting section 222 selects the light region as the candidate of the region 1. When the calculated size index value is outside the predetermined range, the attention region setting section 222 rejects the light region from the candidate of the region 1.

When the size index value is a region, the predetermined range is, for example, 0.6 to 1.0 times the region S of the region onto which the target object is projected in a direction perpendicular to the axial direction thereof. When the size index value is a length, the predetermined range is, for example, 0.8 to 1.0 times the length l. For example, when the calculated shape index value is within a predetermined range on the basis of the shape index value of the target object, the attention region setting section 222 selects the light region as the candidate of the region 1. When the calculated size index value is outside the predetermined range, the attention region setting section 222 rejects the light region from the candidate of the region 1.

When the shape index value is an elliptical eccentricity, the predetermined range is, for example, 0.8 to 1.2 times the elliptical eccentricity e of the region onto which the target object is projected in the axial direction thereof. Even when a non-cylindrical region is present in the shape of the target object, the shape index value may also be calculated based on the region including the portion. Thereby, the attention region approximate to a region of the whole shape of the target object (for instance, a region including the head portion of the bolt) is selected.

In addition, when the attention region setting section 222 calculates the region, the size, and the elliptical eccentricity, the attention region setting section 222 may sequentially calculate the region, the size, and the elliptical eccentricity, and determine whether or not to select the light region as the candidate of the region 1 immediately after the calculation. Since the throughput is decreased due to such sequential calculation, the entire throughput of the two-dimensional data can be decreased. Subsequently, the process proceeds to step S105.

(Step S105) When the target object includes a non-cylindrical region, the attention region setting section 222 removes a region corresponding to the non-cylindrical region from the selected each light region (non-cylindrical region removal). Here, the attention region setting section 222 calculates the most approximate straight line to the light region in the selected light region (two-dimension), for example, using a RANSAC method, a least-squares method, or the like, or another regression analysis method. The attention region setting section 222 counts the number of pixels forming the light region for each coordinate of the calculated straight line direction. A histogram is formed by the distribution of the counted number of pixels with respect to the straight line direction. The attention region setting section 222 removes a region, in which the counted number of pixels is larger than a predetermined number of pixels threshold, from the light region as the non-cylindrical region. The removed non-cylindrical region at this step is a region other than an approximate portion (for instance, the shaft portion of the bolt) to the cylindrical shape of the attention target object. That is, the removed non-cylindrical region is not limited to a portion (for instance, the head portion of the bolt) of the attention target object, and may include a portion of other target object. Subsequently, the process proceeds to step S106.

(Step S106) The attention region setting section 222 determines a light region from which the non-cylindrical region is removed, as the region 1. Here, the attention region setting section 222 may also determine the Nsth largest region (Ns being 1 or a predetermined integer equal to or more than 1) from a region having the largest region in the light region from which the non-cylindrical region is removed, as the regions 1, respectively. Subsequently, the process proceeds to step S107.

(Step S107) The attention region setting section 222 determines a region having a predetermined shape circumscribed to the region 1, as the region 2. Subsequently, the process proceeds to step S108.

(Step S108) The attention region setting section 222 determines a region, which includes the region 2 and has a longer length than that of the region 2 in the longitudinal direction by a predetermined length in the region having a predetermined shape, as the region 3. When the length of the region 3 is determined to be longer than that of the region 2, it may be possible to identify the target objects having different lengths and to detect the whole target object including the non-cylindrical region (for instance, the head portion of the bolt). For example, the predetermined length may also be 0.4 to 1.0 times the length l. Also, the longitudinal length of the region 3 may also be 1.0 to 1.4 times the length l. Subsequently, the process shown in FIG. 5 is ended.

Example of Binary Image

Next, an example of a binary image obtained by binarization of the two-dimensional image will be described.

Figure 6:
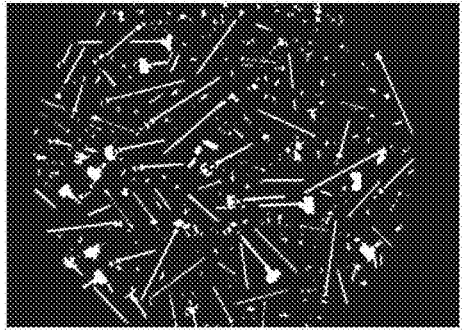
FIG. 6 is a view illustrating an example of a binary image.

FIG. 6 is a view illustrating an example of the binary image.

The binary image shown in FIG. 6 is an image indicated by binary data generated by performing binary processing on the two-dimensional image data of the two-dimensional image shown in FIG. 3, when the attention region setting section 222 determines the attention region. In the example shown in FIG. 6, a region having a signal value of "1" is indicated to be light and a region having a signal value of "0" is indicated to be dark. The light portions refer to target objects.

In addition, when the two-dimensional image is captured, white light may also be radiated to the imaging region Ir from a light source (for instance, a liquid crystal projector) such that the luminance of the region indicative of the target object exceeds a luminance value threshold required to detect the target object.

Next, an example of the expansion/contraction processing (step S102 in FIG. 5) performed by the attention region setting section 222 will be described.

Figure 7C:
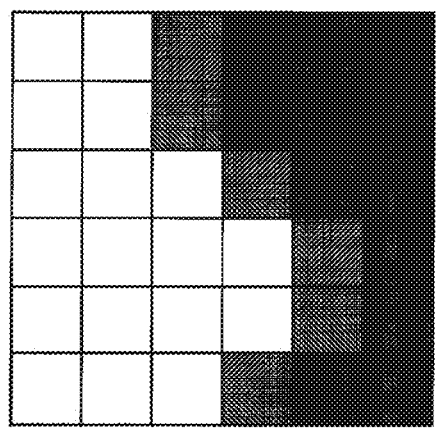
FIGS. 7A to 7C are views illustrating an example of expansion/contraction processing.
Figure 7B:
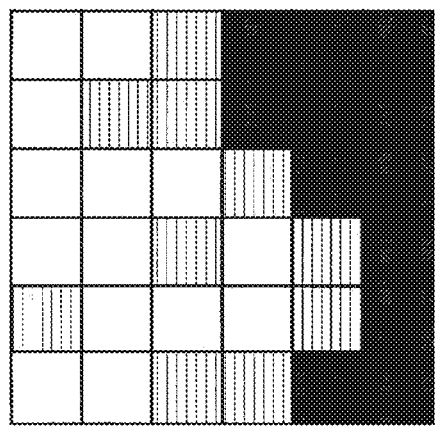
Figure 7A:
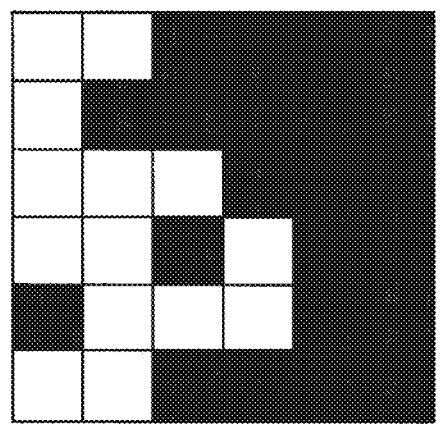

FIGS. 7A to 7C are views illustrating an example of the expansion/contraction processing.

FIG. 7A is an enlarged view illustrating a portion of an original binary image. FIG. 7B shows a binary image obtained by performing the expansion processing on the binary image shown in FIG. 7A. FIG. 7C shows a binary image obtained by performing the contraction processing on the binary image shown in FIG. 7B.

In each of FIGS. 7A to 7C, each quadrangle indicates a pixel. A black quadrangle and a white quadrangle indicate a pixel having a signal value of "1" and a pixel having a signal value of "0", respectively. A region in which the black quadrangles spatially continue indicates a dark region, and a region in which the white quadrangles spatially continue indicates a light region.

In FIG. 7B, a lateral strip quadrangle indicates a pixel having a new signal value determined as "1" by the expansion processing. Such pixels are anew added from the dark region to the light region. Thereby, in the pixels having signal values of "0" in FIG. 7A, an isolated pixel and a pixel protruding to the light region are removed.

In FIG. 7C, a netted quadrangle indicates a pixel having a new signal value determined as "0" by the contraction processing. Such pixels are anew added from the light region to the dark region. Thereby, in the pixels having signal values of "0" in FIG. 7A, since each signal value of an isolated pixel and a pixel protruding to the dark region is not returned to "1", the boundary between the light region and the dark region is smoothed.

Next, an example of the non-cylindrical region removal (step S105 in FIG. 5) performed by the attention region setting section 222 will be described.

Figure 8:
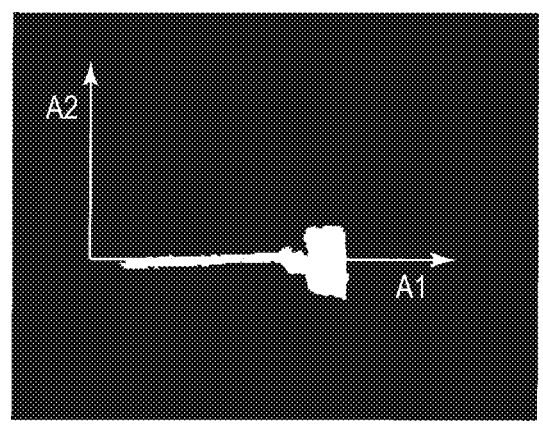
FIG. 8 is a view illustrating an example of a sorted light region.

FIG. 8 is a view illustrating an example of the sorted light region.

The light region shown in FIG. 8 is an example of the light region sorted (step S104 in FIG. 5) by the attention region setting section 222. A straight line A1 is a straight line calculated with respect to the light region by the attention region setting section 222, and is the most approximate straight line to the light region in the longitudinal direction thereof. A straight line A2 is a straight line perpendicular to the straight line A1.

Figure 9:
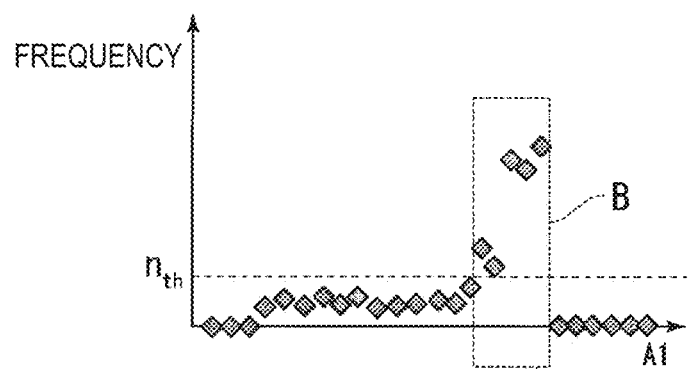
FIG. 9 is an example of a histogram generated by the attention region setting section.

FIG. 9 is an example of a histogram generated by the attention region setting section 222.

In FIG. 9, the vertical axis and the horizontal axis refer to a frequency and coordinates of the straight line A1 direction, respectively. The frequency refers to the number of pixels (pixel number) which are counted by the attention region setting section 222 and form the light region in FIG. 8. For example, $n_{th}$ is a threshold of the number of pixels when the attention region setting section 222 determines whether or not a portion other than the shaft portion in a case in which the target object is the bolt is a non-cylindrical region (the head portion, a portion of another target object, or the like). In such an example, the attention region setting section 222 determines a region, having the coordinate value of the straight line A1 direction within a section B in which the number of pixels is larger than the threshold $n_{th}$, as the non-cylindrical region, and removes the determined non-cylindrical region from the light region. In addition, the attention region setting section 222 may also detect a length traversing the light region in the straight line A2 direction, instead of counting the number of pixels for each coordinate of the straight line A1 direction.

Example of Attention Region

Figure 10:
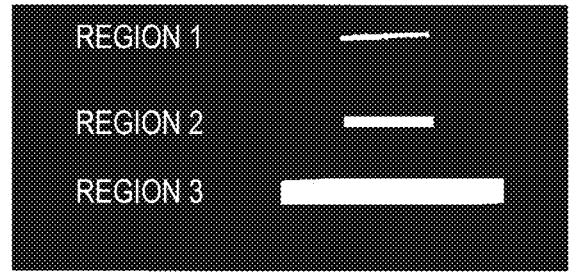
FIG. 10 is a view illustrating an example of the attention region.

FIG. 10 is a view illustrating an example of the attention region.

The region 1 shown in FIG. 10 is a region in which the non-cylindrical region is removed from the light region shown in FIG. 8. The region 1 is a rectangular region in which the target object is projected onto the two-dimensional plane, and the longitudinal direction thereof is specified. This indicates that sample points for estimating the central axis of a cylindrical object are included in the point group data 1 corresponding to the region 1.

The region 2 is a region circumscribed to the region 1, and sample points distributed in a wider three-dimensional region than the point group data 1 are included in the point group data 2 corresponding to the region 2. Although the sample points included in both of the point group data 1 and 2 do not necessarily indicate a whole region of the surface of the cylindrical object, the sample points are used when sample points distributed in a wider region indicated by the point group data 2 finally determine the central axis. Therefore, estimation accuracy of the central axis can be improved. Here, the point group data 2 is used when the above-mentioned point group extraction section 225 counts (votes) the number of sample points and when the second central axis estimation section 226 determines the candidate of the central axis.

The region 3 is a region having a longer longitudinal direction than that of the region 2, and sample points distributed in a wider three-dimensional region than the point group data 2 in the estimated central axis direction are included in the point group data 3 corresponding to the region 3. Thereby, since the length is specified using the distribution with respect to the central axis coordinates of the sample points indicated by the point group data 3, a target object having a predetermined length can be specified even though target objects having different lengths are mixed in the imaging region Ir.

Example of Point Pair

Next, an example of a point pair selected by the first central axis estimation section 224 will be described.

Figure 11A:
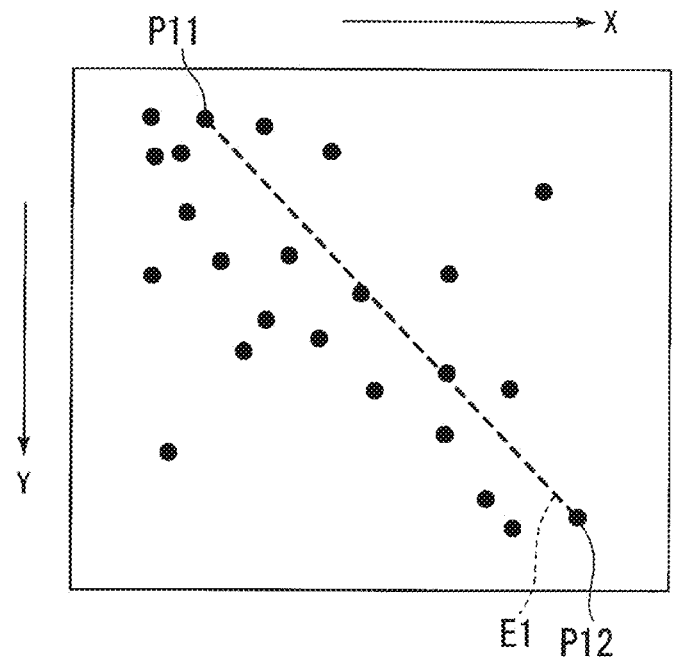
FIGS. 11A and 11B are views illustrating an example of a selected point pair.
Figure 11B:
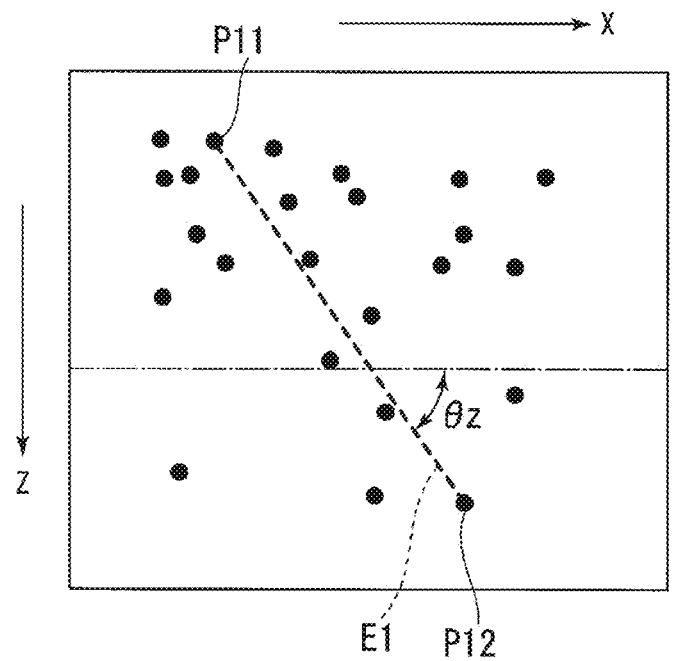

FIGS. 11A and 11B are views illustrating an example of the selected point pair.

FIGS. 11A and 11B show an example of distribution of sample points, which are respectively projected onto the X-Y plane and the X-Z plane, in the attention region. Each black circle refers to a sample point. P11 and P12 are an example of a set of two sample points forming the selected point pair, and E1 refers to a line segment joining between P11 and P12. As described above, the distance L between P11 and P12 is in a predetermined range from the length l of the target object.

The alternate long and short dash line shown in FIG. 11B refers to the X-Y plane in which a Z-coordinate is fixed. The gradient θz is an angle formed by the line segment E1 between P11 and P12 and the X-Y plane. The gradient θz has a smaller value than a threshold θmax of a predetermined gradient. That is, the first central axis estimation section 224 selects a point pair which is formed of one point on the surface of the target object and one point on the bottom surface thereof, and is configured such that the distance L between the two points approximates to the length l, and is reliably detected from the point group data 1, and has a direction capable of being the control target.

Example of Sample Point Belonging to Line Segment

Next, an example of sample points belonging to a line segment extracted by the point group extraction section 225 will be described.

Figure 12A:
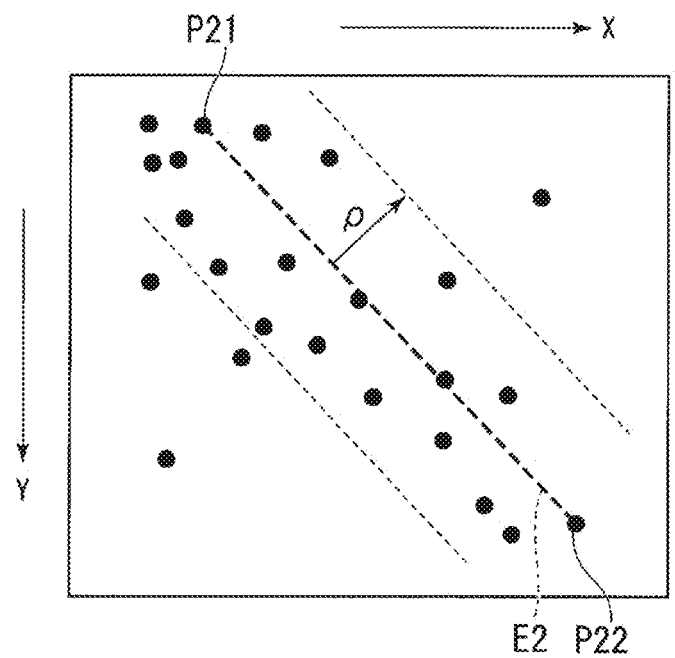
FIGS. 12A and 12B are views illustrating an example of sample points belonging to a line segment.
Figure 12B:
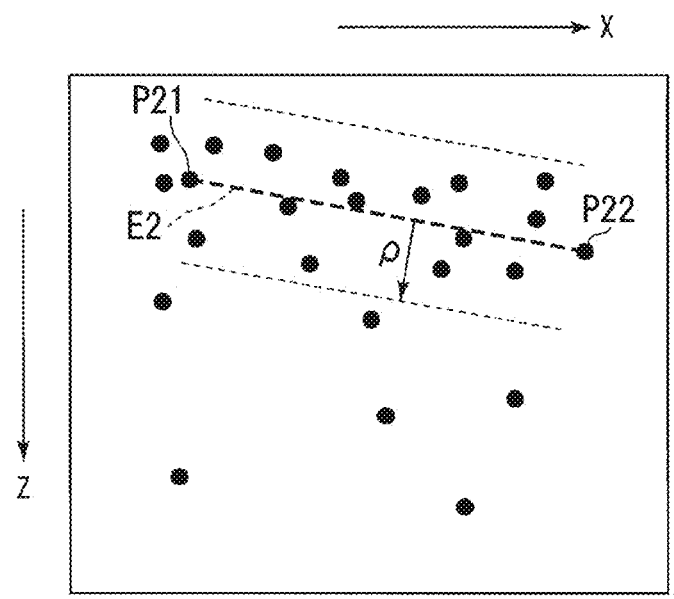

FIGS. 12A and 12B are views illustrating an example of sample points belonging to a line segment.

FIGS. 12A and 12B show other examples of distribution of sample points which are respectively projected onto the X-Y plane and the X-Z plane. Each black circle refers to a sample point. P21 and P22 are other examples of a set of two sample points forming a point pair, and E2 refers to a line segment joining between P21 and P22. The sample points belonging to the line segment E2 are sample points included in a range of a distance ρ from the line segment E2. The point group extraction section 225 selects the sample points from the point group data 2, and adopts a point pair in which the number of selected sample points N is in a predetermine number range, and sample points thereof.

Example of Selected Central Axis

Next, an example of the central axis selected by the central axis selection section 227 will be described.

Figure 13:
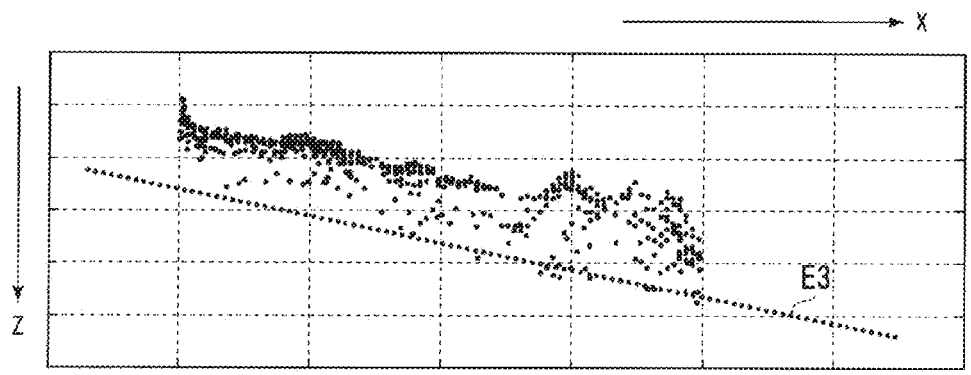
FIG. 13 is a cross-sectional view illustrating an example of a selected central axis.

FIG. 13 is a cross-sectional view illustrating an example of the selected central axis.

In such an example, the central axis E3 and the distribution of the selected sample points used to calculate the central axis E3 are projected onto the X-Z plane. Each point refers to a sample point. Most of the selected sample points are concentratedly distributed in the Z-axis negative direction from the central axis E3 by a predetermined distance, but an extension direction of the distribution is nearly parallel with the direction of the central axis E3. The concentrated distribution indicates a portion facing the imaging device 10 on the surface of the target object, and occurs because other portions do not appear thereon.

Example of Distribution of Sample Point

Next, an example of the distribution of the sample points indicated by the point group data 3 used when the space data generation section 228 calculates the position, posture, and the like of the target object will be described.

Figure 14:
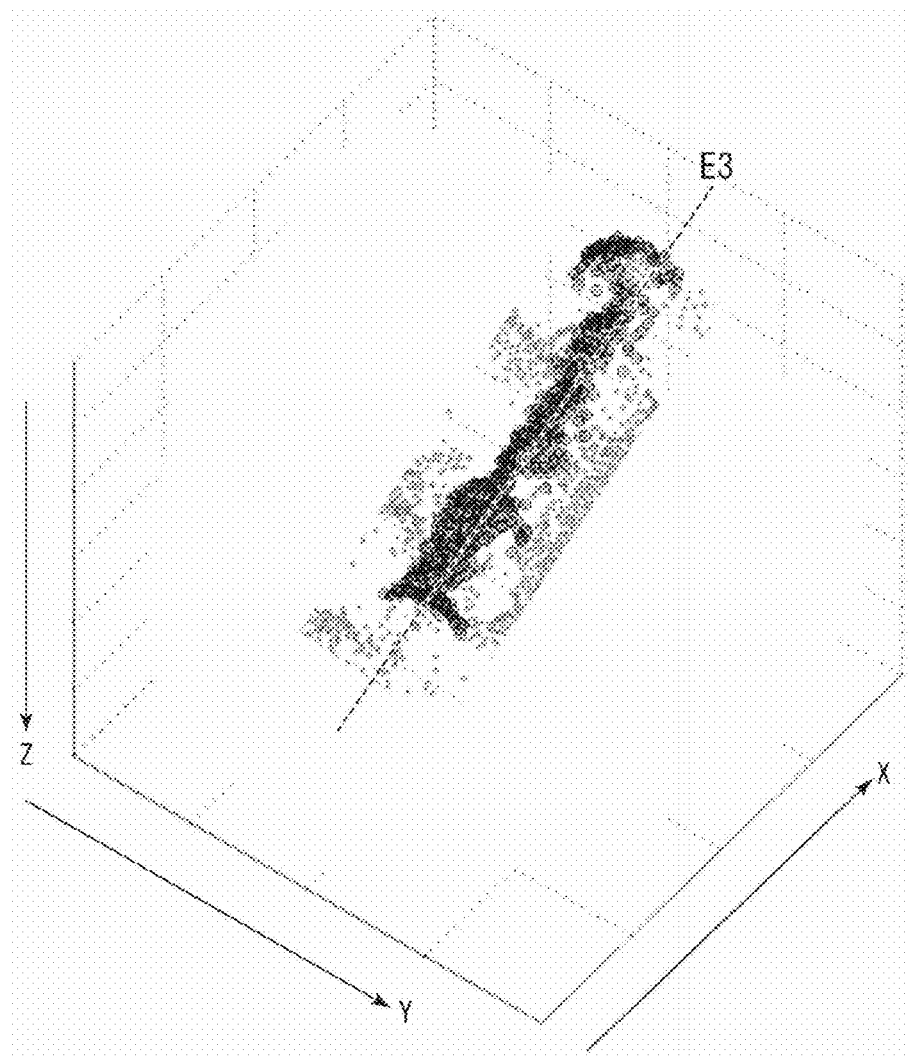
FIG. 14 is a perspective view illustrating an example of the central axis and the sample points.

FIG. 14 is a perspective view illustrating an example of the central axis and the sample points.

Each point refers to a sample point indicated by the point group data 3 corresponding to the region 3. Here, the thick point refers to a selected sample point used to calculate the central axis E3. The thick points indicate the shape of the surface of one target object, and are distributed on a surface bent about the above central axis E3. A distance from the central axis to the surface approximates to a radius r. The point group data 3 has a possibility that sample points are distributed in a wider region than the sample point selected in the direction of the central axis E3. However, due to such point group data 3, a clue for distinguishing objects having different axial lengths is given.

Figure 15:
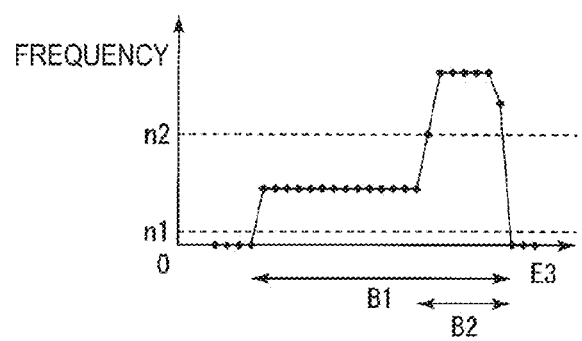
FIG. 15 is an example of a histogram generated by a space data generation section.

FIG. 15 is an example of a histogram generated from a space data generation section 228.

In FIG. 15, the vertical axis indicates the frequency and the horizontal axis indicates the coordinate in the direction of a central axis E3. The frequency indicates the number of sample points of FIG. 14 with respect to the coordinate in the direction of the central axis E3.

Further, n1 and n2 indicate the first threshold value and the second threshold value respectively. B1 and B2 indicate a section whose frequency exceeds the first threshold value and a section whose frequency exceeds the second threshold value respectively. Accordingly, the space data generation section 228 can determine the length of the section B1 in the direction of the central axis E3 as the length of a target object and specify the region in which the sample points having the central axis coordinate in the range of the section B2 are distributed as a non-cylindrical region. Further, the space data generation section 228 calculates the position of the gravity point of the specified non-cylindrical region.

The histogram shown in FIG. 15 is different from the histogram (FIG. 9) generated from a two-dimensional bright region in that the histogram shown in FIG. 15 is generated based on the sample points indicated by point group data 3. Accordingly, the histogram shown in FIG. 15 is more reliable as data compared to the histogram shown in FIG. 9. In addition, while the histogram shown in FIG. 15 is used for detection of a non-cylindrical region of a target object (for example, a head portion of a bolt), the histogram shown in FIG. 9 is used for extraction of a region (for example, a shaft portion of a bolt) which can be approximated to a cylinder from the target object and for elimination of other regions.

Control Flow

Next, robot control according to the present embodiment will be described.

Figure 16:
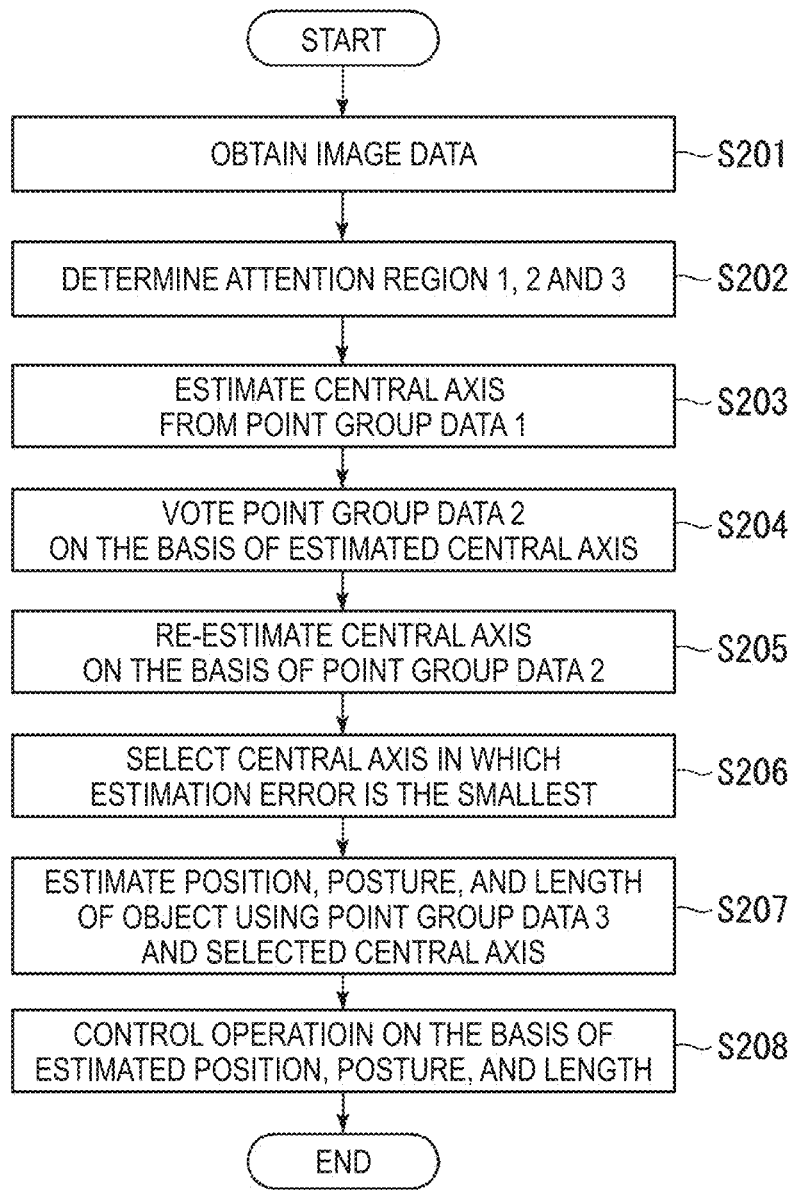
FIG. 16 is a flowchart illustrating robot control according to the embodiment.

FIG. 16 is a flowchart showing robot control according to the present embodiment.

(Step S201) Three-dimensional image data showing three-dimensional captured image which is captured by the imaging device 10 and two-dimensional image data showing two-dimensional image are input to the image data acquisition unit 21. The image data acquisition unit 21 can receive three-dimensional captured image (entire image) showing the entire imaging region Ir and two-dimensional image by acquiring three-dimensional image data and two-dimensional image data. Next, the process advances to Step S202.

(step S202) The attention region setting section 222 determines, for example, regions 1, 2, and 3 as target regions from two-dimensional image shown by the two-dimensional image data acquired by the image data acquisition unit 21. The attention region setting section 222 generates point group data 1, 2, and 3 showing sample points to be distributed in three-dimensional partial regions 1, 2, and 3 corresponding to the determined regions 1, 2, and 3. Next, the process advances to Step S203.

(Step S203) The first central axis estimating section 224 estimates the central axis from the sample points shown by the point group data 1. Here, the first central axis estimating section 224 extracts two points from the sample points of the point group data 1, selects Ne number of point pairs between which distance L is within the range determined from the length l in advance, and calculates the constant indicating a straight line between two points respectively forming the selected point pairs. The first central axis estimating section 224 selects point pairs in the range of inclination predetermined by inclination θz with respect to an X-Y plane derived from the calculated constant and generates selected point pair information indicating the selected point pairs. Next, the process advances to Step S204.

(Step S204) The point group extraction section 225 extracts sample points in a predetermined distance ρ from a segment (central axis) connecting two points respectively forming a point pair shown by selected point pair information from sample points shown by point group data 2 as points belonging to the segment and counts the number of Nc of extracted sample points (voting). The point group extraction section 225 selects point pairs in which the number Nc of extracted sample points is within the range of the predetermined number and generates extracted point group information showing sample points extracted for each selected point pair. Next, the process advances to Step S205.

(Step S205) The second central axis estimation section 226 estimates (re-estimates) candidates of the central axis on the surface covered by sample points shown by extracted point group information generated based on point group data 2 for each point pair. The second central axis estimation section 226 generates central axis information formed of constants of estimated central axis candidates. Next, the process advances to Step S206.

(Step S206) The central axis selection section 227 selects central axes in the range of inclination predetermined by inclination θz with respect to the X-Y plane indicated by the constants of central axis candidates indicated by the central axis information. The central axis selection section 227 calculates estimated error err based on the sample points indicated by the extracted point group information corresponding to respective selected central axes and selects the central axis with smallest calculated estimated error err. The central axis selection section 227 generates central axis information related to the selected central axis. Next, the process advances to Step S207.

(Step S207) The space data generation section 228 calculates (estimates) the position, posture, and length of the target object based on the sample points and the central axis information indicated by the point group data 3. The space data generation section 228 generates spatial data indicating the calculated position, posture, and length. Next, the process advances to Step S208.

(Step S208) The control signal generation section 229 generates control signal for controlling the operation of the robot 30 based on the load signal input from the robot 30 and any of the position, posture, and length indicated by the spatial data or an arbitrary combination of these and outputs the generated control signal to the robot 30. In this manner, the control signal generation section 229 controls the operation of the robot 30. The operation is an operation of gripping a target object. Next, the process shown in FIG. 16 is terminated.

Further, in a case where classification of the lengths of target objects is not necessary (for example, the lengths of whole target objects arranged in the imaging region Ir are the same), the attention region setting section 222 may not perform determination of the region 3 or generation and output of the point group data 3. In this case, the number Ni of the target region determined by the attention region setting section 222 becomes 2. In the case where the attention region setting section 222 does not perform the output of the point group data 3, the attention region setting section 222 outputs the point group data 2 in place of the point group data 3 to the space data generation section 228. The space data generation section 228 calculates the position, posture, and the like of a target object based on the point group data 2 in place of the point group data 3.

Further, the number of point pairs selected by the first central axis estimating section 224 is greater than 1 in general. In the case where the number of pair points to be selected is greater than 1, the processes of Steps S104 and S105 may be repeated or performed in parallel for each pair point.

As described above, in the present embodiment, a hand (for example, the hand portion 30c) and the control unit (for example, the control unit 22) of operating the hand are included, three-dimensional point group information (for example, point group data 1, 2, and 3) is generated with respect to a partial image (for example, a target region) among captured images (for example, a two-dimensional image) of plural objects (for example, target objects) captured by the imaging unit, and an object captured in the partial image is gripped by the hand.

In this manner, one object is specified from plural objects shown in the captured image, and a process related to the one object distributed in the captured image can be effectively performed by allowing the specified object to be gripped by the hand. That is, in the present embodiment, three-dimensional point group information is not generated with respect to entire captured images, and a process of specifying a region in which three-dimensional point group information corresponding to some of the images is generated through image processing of the two-dimensional captured image and detecting the space state of the object with respect to the region is performed. The processing speed is improved since the processing amount is drastically reduced compared to a case of sequentially setting a target region (partial image) for each predetermined amount of displacement in a captured image and then performing processes for each set target region in the related art.

In the present embodiment, a first region (for example the region 1) representing one object from a captured image and a second region (for example, the region 2) including the first region and having a predetermined shape are determined, and first three-dimensional point group information (for example, point group data 1) corresponding to the first region (for example, the region 1) and second three-dimensional point group information (for example, point group data 2) corresponding to the second region (for example, the region 2) are generated from the captured image. Further, in the present embodiment, a set in which the length of a segment between two points is within the range of a predetermined length is selected from plural sets formed of two points included in the first three-dimensional point group information, and points in the predetermined range from the segment between two points forming the selected set are extracted from the second three-dimensional point group information. In addition, in the present embodiment, a central axis in which a difference (for example, an error) between the distance from the second three-dimensional point group information to each extracted point and a predetermined threshold value (for example, a radius r of a target object) is in the predetermined range is selected.

According to the configuration, the processing amount can be reduced since the first three-dimensional point group information corresponding to the first region and the second three-dimensional point group information corresponding to the second region can be determined as targets for processing based on the captured image. Further, points representing an image of a target object formed from points whose radius from the central axis connecting two points whose length is in the predetermined range is in the predetermined range are specified. Therefore, it is possible to estimate the position and posture of a target object (for example, a screw, a bolt, and the like) having a cylindrical shape or approximated to a cylindrical shape as a target object having a curved surface. In addition, since a central axis is selected based on points of the second three-dimensional point group information related to the second region wider than the first region related to the first three-dimensional point group information in which a set of two points used for estimation of the central axis is selected, it is possible to reduce the amount of processing required to estimate the position and posture of the target object and to speed up the process without damaging the precision.

Moreover, in the present embodiment, it is possible to control the operation of a robot (for example, the robot 30) including a hand (for example, the hand portion 30c) capable of gripping a target object based on spatial data of the estimated position and posture. In this manner, since the robot 30 can perform an operation of gripping a target object based on captured image imaged by a more versatile imaging unit, it is possible to handle a target object stacked disorderly without using a special jig or the like.

Modification

The technical scope of the invention is not limited to the embodiments described above and it is possible to make various changes without departing from the scope of the invention. In the embodiments described above, a case where the shape of the object mainly is the cylinder or approximates the cylinder is exemplified, but the invention is not limited to the embodiments. For example, the shape of the object may be an object having a three-dimensional shape such as a prism such as triangular prism and a rectangular prism or a shape approximating the prism.

Furthermore, the attention region setting section 222 may perform at least step S101 to step S104 and step S106 in the process illustrated in FIG. 5. The attention region setting section 222 may omit an entire or a part of step S105, step S107, and step S108 according to the shape, the size, or the type of the object. For example, when the diameter is constant in a case where the shape of the object is geometrically simple cylinder or prism, since it is not necessary to consider a change in the diameter as the bolt head, the attention region setting section 222 may omit step S105. Furthermore, in the object having a constant diameter, since the width is represented as a constant region in the two-dimensional image, a change in the shape due to the position or the posture thereof is relatively small. Thus, the attention region setting section 222 may omit calculation of the ellipse eccentricity or the selection of the bright region based on the ellipse eccentricity in step S104.

Furthermore, the object may have an irregular portion such as the bolt head having not constant diameter, the portion may have a shape that cannot approximate a geometrically simple shape such as the prism or the cylinder, and the shape may affect the estimation of the position and the posture. In such a case, the attention region setting section 222 performs a shape-specific process instead of step S105 of FIG. 5 and a region that may represent the portion may be deleted from the bright region selected in step S104. For example, such a portion corresponds to the pin and the claw if the object is the connector and corresponds to the lid, the opening section, the edge of the opening section if the object is the plastic bottle. The shape-specific process is different for each portion that is the object. For example, if the object is the connector, the plastic bottle, and the bolt, the attention region setting section 222 identifies the region capable of approximating the shape of the template from the bright region and the other region. Thus, the region that may be the claw of the connector, the lid of the plastic bottle, and the head portion of the bolt is identified. The shape of the template is a shape that is formed by projecting the geometrically simple shape such as the prism, the cylinder, and the flat plate in the two-dimensional image, for example, is rectangular. Then, the attention region setting section 222 deletes the other region identified from the bright region and may leave the region capable of approximating the shape of the template.

Furthermore, if the shape of the object is a shape having a plane such as the prism, the attention region setting section 222 may omit step S107 of FIG. 5. Furthermore, if it is necessary to distinguish the length of the object as described above, the attention region setting section 222 may omit step S108. If the regions 2 and 3 are not determined by omitting steps S107 and s108, the control unit 22 may use the point group data 1 instead of the point group data 2 and 3 respectively corresponding to the regions 2 and 3 in steps S203 to S208 of FIG. 16.

Furthermore, the embodiments described above are described on the assumption that the length (height) or the radius of the object is set in advance in the control unit 22, but the invention is not limited to the embodiments. The control device 20 may include an input section (not illustrated) capable of inputting the length and the radius in response to the operation of the user and may include a communication section (not illustrated) capable of receiving the length and the radius through a communication line. In the embodiments described above, an example of a case where the second central axis estimation section 226 estimates the central axis candidate using the sequential quadratic estimation method is described, but the invention is not limited to the embodiments. The second central axis estimation section 226 can use a non-linear programming method such as a Newton method or a regression analysis method such as the minimum square method as another method.

The imaging device 10 may individually output the image data of each frame to the control device 20 or may sequentially output the image data to the control device 20 at predetermined time interval. The imaging device 10 may be integrally formed with the control device 20. In the embodiments described above, an example of a case where the control device 20 and the robot 30 are individually configured is described, but the invention is not limited to the embodiments. The control device 20 may be integrally formed with the robot 30.

Figure 17:
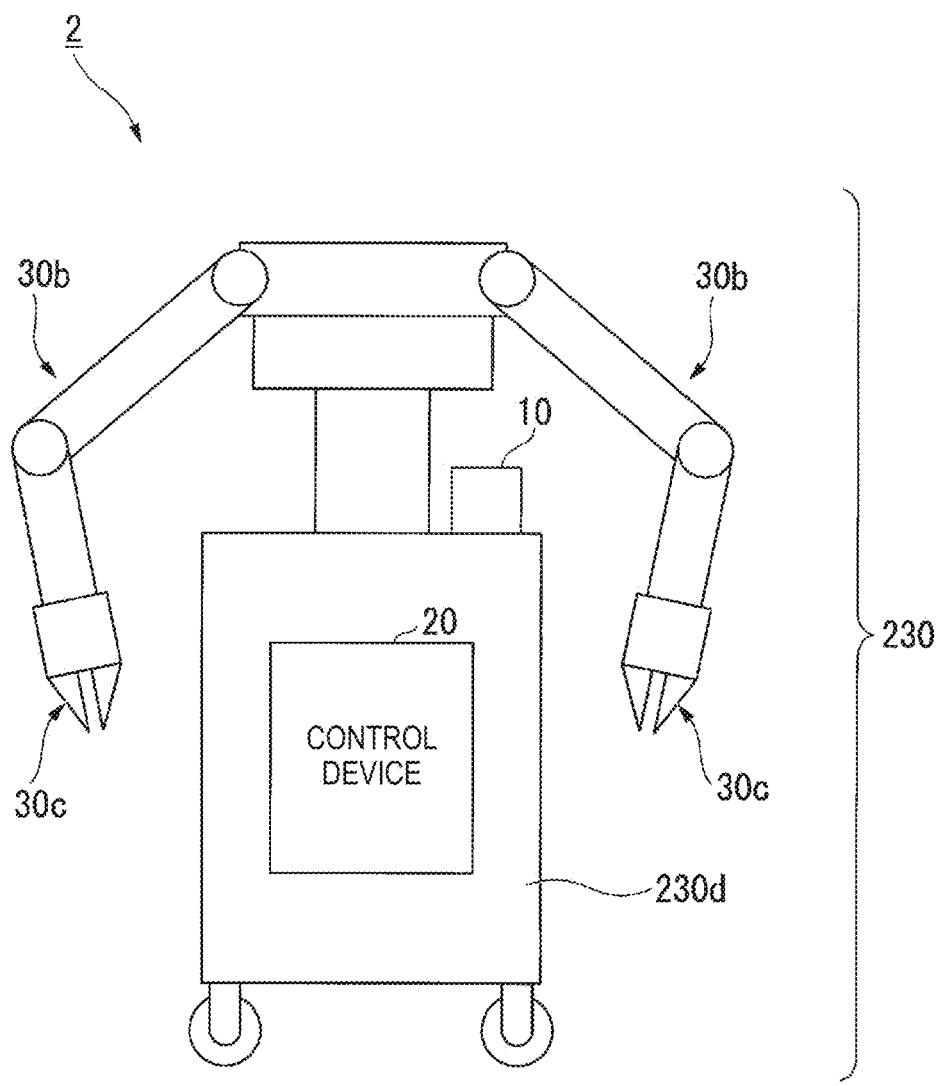
FIG. 17 is a view illustrating a configuration of a robot system according to a modification example of the embodiment.

Though the robot 30 according to the embodiments described above is the single arm robot including one set of the arm section 30b and the hand section 30c, the invention is not limited to the embodiments. The number of the arm section 30b and the hand section 30c included in the robot 30 may be respectively one or more. FIG. 17 is a view illustrating a configuration of a robot system 2 according to the embodiment. The robot system 2 includes a robot 230 instead of the robot 30 in the robot system 1 (FIG. 1). The robot 230 is a dual-arm robot including two sets of an arm section 30b and a hand section 30c. The robot 230 includes a storage section 230d, the control device 20 is stored inside of the storage section 230d, and the imaging device 10 is disposed on an upper surface of the storage section 230d. Thus, the imaging device 10, the control device 20, and the robot 230 are integrally configured. Furthermore, wheels are mounted on a bottom surface of the storage section 230d. Thus, an entirety of the robot system 2 is configured to be moved by applying an external force.

Furthermore, a program for performing each process of a part of the control device 20, for example, the image data acquisition unit 21, the attention region setting section 222, the first central axis estimation section 224, the point group extraction section 225, the second central axis estimation section 226, the central axis selection section 227, the space data generation section 228, and the control signal generation section 229 is recorded in a computer readable recording medium and the program recorded on the recording medium is read and executed by the computer system, and thereby various processes described above according to the control device may be performed.

Moreover, the term "computer system" referred in here may include hardware such as an Operating System (OS) or a peripheral device in addition to the hardware such as a Central Processing Unit (CPU) and a Graphics Processing Unit (GPU) that performs the process described above. Furthermore, if the "computer system" uses a WWW system, website providing environment (or display environment) is also included. Furthermore, the term "computer readable recording medium" is referred to as a storage device such as a writable non-volatile memory such as a flexible disk, a magneto-optical disk, a Read Only Memory (ROM), and a flash memory; a portable medium such as a Compact Disc (CD)-ROM; and a hard disk built in the computer system.

Furthermore, "the computer readable recording medium" includes a medium holding a predetermined time program such as a volatile memory (for example, DRAM: Dynamic Random Access Memory) inside the computer system that is a server or a client if the program is transmitted through a network such as the Internet or a communication line such as a telephone line. Furthermore, the program described above may be transmitted to another computer system from the computer system in which the program is stored in the storage device through a transmitting medium or by a transmitting wave in the transmitting medium. Here, "transmitting medium" which transmits a program is referred to as a medium having a function for transmitting information such as the network (communication network) such as the Internet or the communication wiring (communication line) of the telephone. Furthermore, the program described above may be one for implementing a part of the function described above. Furthermore, a so-called a differential file (differential program) that can achieve the function in combination with the program already recorded in the computer system.

The embodiments of the invention are described in detail above with reference to the drawings, but the specific configuration is not limited to the embodiments and design and the like are also included without departing from the scope of the invention.

The entire disclosure of Japanese Patent Application No. 2014-019827, filed Feb. 4, 2014 is expressly incorporated by reference herein.

What is claimed is:

1. A robot comprising:
   a hand; and
   a control unit that operates the hand,
   wherein an imaging device captures an image of an object and generates three-dimensional image data, and
   the control unit generates three-dimensional point group information for a partial image of a portion of the generated three-dimensional image data, calculates a position and a posture of the object based on the three-dimensional point group information, and causes the hand to hold the object included in the partial image.

2. The robot according to claim 1,
   wherein the control unit
   defines a first region indicating the object, and a second region including the first region and having a predetermined shape, from the captured image;
   generates first three-dimensional point group information corresponding to the first region and second three-dimensional point group information corresponding to the second region on the basis of the captured image;
   selects a set in which a length of a line segment between two points is within a predetermined length range from among a plurality of sets each of which is formed by two points included in the first three-dimensional point group information;

extracts points which are within a predefined range from the line segment between the two points forming the selected set, from the second three-dimensional point group information; and selects a central axis in which a difference between a distance to each extracted point and a predetermined threshold value is within a predefined range, from the second three-dimensional point group information.

3. The robot according to claim 2, wherein the control unit detects a region in which luminance is greater than a predefined threshold value from the captured image, and determines a region in which an index value indicating a shape of the detected region is within a predetermined range as the first region.

4. The robot according to claim 2, wherein a shape of the second region is a rectangular shape, and wherein the control unit defines a third region whose length is larger than a length of the second region in a longitudinal direction from the captured image, extracts third three-dimensional point group information corresponding to the third region from the captured image, and calculates a length of the object in a direction of the central axis on the basis of a distribution of points included in the third three-dimensional point group information in the direction of the central axis.

5. A control device comprising:

an image reception unit that receives a captured image obtained by an imaging unit capturing an image of a plurality of objects and generates three-dimensional image data; and a processing unit that operates a robot, wherein the processing unit generates three-dimensional point group information for a partial image of a portion of the generated three-dimensional image data, calculates a position and a posture of at least one of the plurality of objects based on the three-dimensional point group information, and causes the robot to hold at least one of the plurality of objects included in the partial image.

6. A robot system comprising:

an imaging unit that captures an image of a plurality of objects and generates three-dimensional image data;

a robot; and a control unit that operates the robot, wherein the control unit generates three-dimensional point group information for a partial image of a portion of the generated three-dimensional image data, calculates a position and a posture of at least one of the plurality of objects based on the three-dimensional point group information, and causes the robot to hold at least one of the plurality of objects included in the partial image.

7. A control method comprising:

capturing an image of a plurality of objects and generating three-dimensional image data;

generating three-dimensional point group information for a partial image of a portion of the generated three-dimensional image data;

calculating a position and a posture of at least one of the plurality of objects based on the three-dimensional point group information; and causing a robot to hold at least one of the objects included in the partial image by using the generated three-dimensional point group information.

* * * * *